United States Patent [19]
Murphy

[11] 4,438,436
[45] Mar. 20, 1984

[54] MILLIMETER WAVE MONOPULSE COMPARATOR CIRCUIT

[75] Inventor: Earl R. Murphy, Scottsdale, Ariz.

[73] Assignee: Motorola Inc., Schaumburg, Ill.

[21] Appl. No.: 327,334

[22] Filed: Dec. 4, 1981

[51] Int. Cl.³ .............................................. G01S 13/00
[52] U.S. Cl. ............................... 343/16 M; 333/120; 333/238
[58] Field of Search ................... 333/1, 12, 116, 117, 333/120, 238; 343/16 M

[56] References Cited
U.S. PATENT DOCUMENTS 3,307,189  2/1967  Meade ............................. 333/120 X
3,438,044  4/1969  Elia et al. ......................... 343/16 M
3,990,078  11/1976  Bellee et al. ..................... 343/770

OTHER PUBLICATIONS

Oltman et al., *Millimeter Wave Seeker Technology*, Article Released to AIAA, 78-1259, 1978.

Primary Examiner—Paul L. Gensler
Attorney, Agent, or Firm—Jonathan P. Meyer; Eugene A. Parsons

[57] ABSTRACT

An improved monopulse comparator circuit is achieved by a unique circuit layout. Four hybrid junctions are arranged on a low dielectric constant substrate and are interconnected in such way as to form a closed square figure. Distances between adjacent hybrid junctions are thus minimized. Input lines which connect the comparator circuit to a monopulse antenna array are disposed on the substrate external to the closed figure, as are output lines which connect the comparator to a monopulse guidance system. Right angle microstrip to waveguide transitions are used so that the comparator circuit need not be integrated onto the same substrate as the antenna array and the guidance system. The entire comparator layout is channelized to increase isolation between closely spaced lines.

3 Claims, 6 Drawing Figures

MILLIMETER WAVE MONOPULSE COMPARATOR CIRCUIT

FIELD OF THE INVENTION

The present invention relates, in general, to monopulse radar systems. More particularly, the invention relates to a novel comparator circuit for use in a millimeter wave monopulse radar system.

BACKGROUND OF THE INVENTION

The basic function of a monopulse radar system is to determine the direction of a target with respect to the radar antenna from a single pulse of electromagnetic energy received by the antenna from the target. This is generally accomplished by utilizing an antenna array which comprises several individual elements which are arranged in a regular pattern. The signals received by each antenna are slightly different, so a comparison of the several signals results in the needed direction information.

The use of four-port hybrid junctions as elements of monopulse comparator circuits is well known. Comparator circuits of this type are commonly manufactured in microstrip for use at microwave frequencies. However, the adaptation to higher, millimeter wave frequencies challenges the capability of known microstrip technology to produce accurate, repeatable and inexpensive comparator circuits. These problems are enhanced if it is desired to obtain a comparator circuit of the smallest possible overall dimensions. Particular problems encountered are the use of relatively expensive ceramic substrates, the lack of an efficient circuit layout to reduce overall dimensions and electromagnetic coupling between closely spaced microstrip lines.

SUMMARY OF THE INVENTION

Accordingly, it is an object of the present invention to provide an improved millimeter wavve monopulse comparator circuit.

It is a further object to provide a millimeter wave monopulse comparator circuit manufactured in microstrip on an inexpensive, low dielectric constant substrate.

It is yet a further object of the present invention to provide a very compact millimeter wave monopulse comparator circuit with well isolated microstrip lines.

A particular embodiment of the present invention comprises four hybrid junctions disposed on a Teflon ® substrate and interconnected by very short high impedance lines. The hybrid junctions and the interconnection lines form a closed figure approximating a square. Right angle microstrip to waveguide transitions disposed on the substrate provide means for coupling the comparator circuit to an antenna array and to a monopulse guidance system which utilizes the direction information generated by the comparator circuits. Phasing is accomplished in lower impedance microstrip lines connecting the hyrid junctions to the microstrip to waveguide transitions. The entire comparator circuit is channelized to provide isolation between adjacent lines.

These and other objects and advantages of the present invention will be apparent to one skilled in the art from the detailed description below taken together with the drawings.

DETAILED DESCRIPTION OF THE INVENTION

Figure 1:
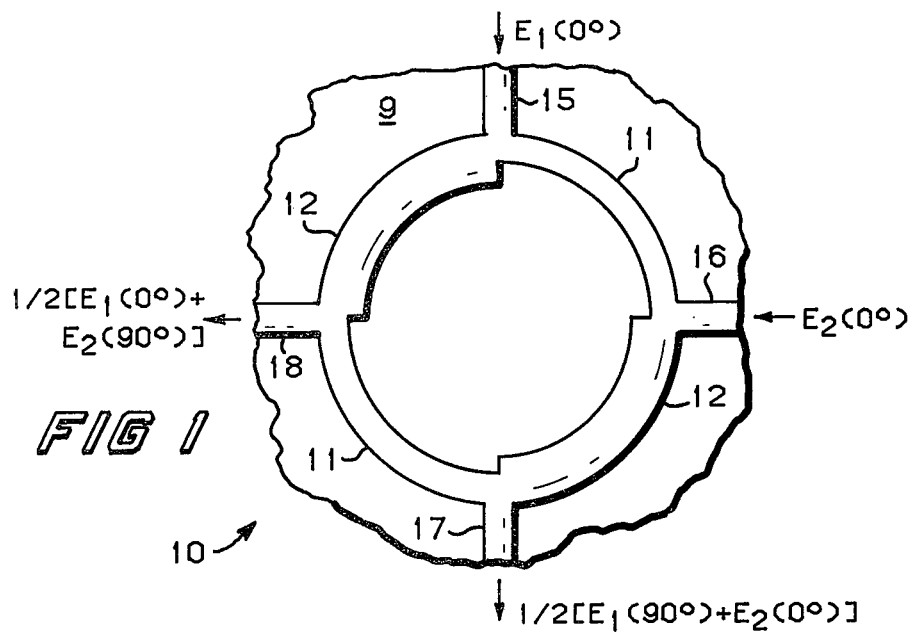
FIG. 1 is a schematic diagram of a hybrid junction.

Referring to FIG. 1, the operation of a hybrid junction 10 is described. Hyrid junction 10 may be manufactured by familiar techniques resulting in a metal pattern on a substrate 9. Hybrid junction 10 comprises two portions 11 which have an impedance $Z_1$ and two portions 12 which have an impedance $Z_2$. Portions 11 and portions 12 form alternate sections of a closed ring and ports 15, 16, 17 and 18, which also have an impedance $T_1$, intersect the ring at the transitions from one portion to another. A signal $E_1(0°)$, wherein the number in parenthesis represents the phase angle in degrees, which is input to hybrid junction 10 at port 15 will not appear at port 16, but will appear equally divided between ports 17 and 18. The signal present at port 17 will be shifted in phase by 90° with respect to the signal present at port 18. Therefore the signal at port 18 is $\frac{1}{2} E_1(0°)$ and the signal at port 17 is $\frac{1}{2} E_1(90°)$. Similarly, if a signal $E_2(0°)$ is input at port 16, then a signal $\frac{1}{2} E_2(0°)$ will appear at port 17 and a signal $\frac{1}{2} E_2(90°)$ will appear at port 18. If both input signals are present, then a signal $\frac{1}{2} [E_1(0°)+E_2(90°)]$ will appear at port 18 and a signal $\frac{1}{2} [E_1(90°)+E_2(0°)]$ will appear at port 17. It will be convenient to refer to ports 15 and 16 as input ports and ports 17 and 18 as output ports in the discussion below. It is to be understood that a hybrid junction operates in either direction and that the ports of the hybrid junction are not inherently suitable only as input ports or only as output ports.

Figure 2:
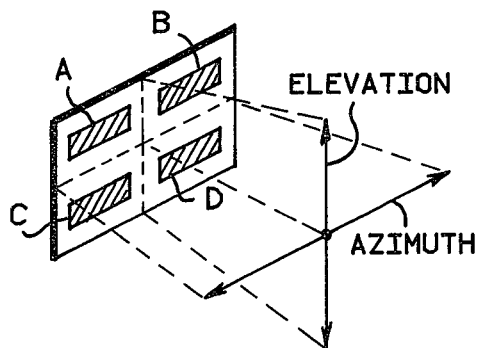
FIG. 2 is a simplified diagram of a monopulse antenna array.

Referring now to FIG. 2, a diagram representing a simplified monopulse antenna array is shown. Four antennas A, B, C and D are arranged in a generally square or rectangular array. Antennas A, B, C, and D may be slot radiators, as suggested by FIG. 2, or they may be horns located at the feedpoint of a reflector, or various other possibilities. An elevation axis is defined vertically and an azimuth axis is defined horizontally. As is familiar in the art, an elevation angle and an azimuth angle are sufficient to specify the direction of a target relative to the antenna. A target having a non-zero elevation angle will produce a different signal in the antenna pair A+B than in the antenna pair C+D. Therefore, an error signal which is proportional to the elevation angle may be generated by properly combining the four antenna signals. This signal is represented by $\Delta EL$ and is proportional to $(A+B)-(C+D)$. In the phase representation used in reference to FIG. 1, $\Delta EL$ is proportional to $[A(0°)+B(0°)+C(180°)+D(180°)]$. Similarly, the azimuth error signal $\Delta AZ$ is proportional to $[A(0°)+C(0°)+B(180°)+D(180°)]$. As is familiar in the art, monopulse guidance involves detecting nulls (zeroes) in the $\Delta EL$ and $\Delta AZ$ signals when the antenna array is "aimed" at the target. A third signal commonly generated by monopulse comparator circuits is represented by SUM and is proportional to [A(0°)+B(0°)+C(0°)+D(0°)].

Figure 3:
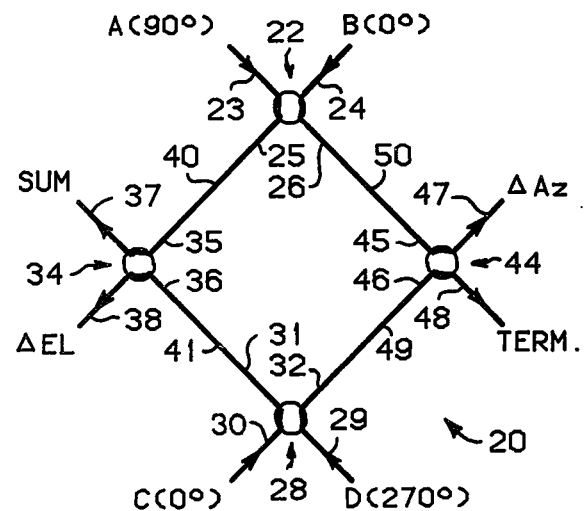
FIG. 3 is a schematic diagram of a monopulse comparator circuit.

Referring now to FIG. 3, a monopulse comparator circuit 20 is shown schematically. A first hybrid junction 22 has input ports 23 and 24 and output ports 25 and 26. A second hybrid junction 28 has input ports 29 and 30 and output ports 31 and 32. A third hybrid junction 34 has an input port 35 connected to output port 25 of hybrid junction 22 by means of interconnection line 40 and an input port 36 connected to output port 31 of hybrid junction 28 by means of interconnection line 41. Hybrid junction 34 also has output ports 37 and 38. A fourth hybrid junction 44 has an input port 45 connected to output port 26 of hybrid junction 22 by means of interconnection line 50 and an input port 46 connected to output port 32 of hybrid junction 28 by means of interconnection line 49. Hybrid junction 44 also has output ports 47 and 48.

Monopulse comparator circuit 20 operates in conjunction with an antenna array such as shown in FIG. 2 to produce SUM, $\Delta$EL and $\Delta$AZ signals. A signal A(90°) is input to hybrid junction 22 at input port 23 and a signal B(0°) is input at input port 24. Thus, interconnection line 40 carries a signal $\frac{1}{2}$ [A(90°)+B(90°)] and interconnection line 50 carries a signal $\frac{1}{2}$ [A(180°)+B(0°)]. Similarly, a signal C(0°) is input at input port 30 and a signal D(270°) is input at port 29. Therefore interconnection line 41 carries a signal $\frac{1}{2}$ [C(0°)+D(0°)] and interconnection line 49 carries a signal $\frac{1}{2}$ [C(90°)+D(270°)]. If interconnection lines 40, 41, 49 and 50 preserve all of the phase relationships, then output port 37 of hybrid junction 34 will present a signal $\frac{1}{4}$ [A(90°)+B(90°)+C(90°)+D(90°)], which is utilized as the SUM signal. A signal $\frac{1}{4}$ [A(180°)+B(180°)+C(0°)+D(0°)] will be present at output port 38 and is utilized as $\Delta$EL. The $\Delta$AZ signal, $\frac{1}{4}$ [A(180°)+C(180°)+B(0°)+D(0°)] is present at output port 47. Output port 48 carries a difference signal which need not be utilized for monopulse guidance, so it is terminated in a resistive load to avoid reflections.

Figure 4B:
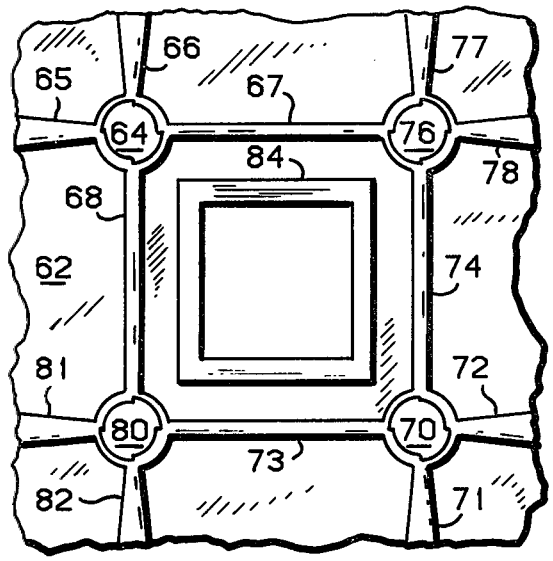
FIG. 4B is an enlarged plan view of a central portion of the layout of FIG. 4A.
Figure 4A:
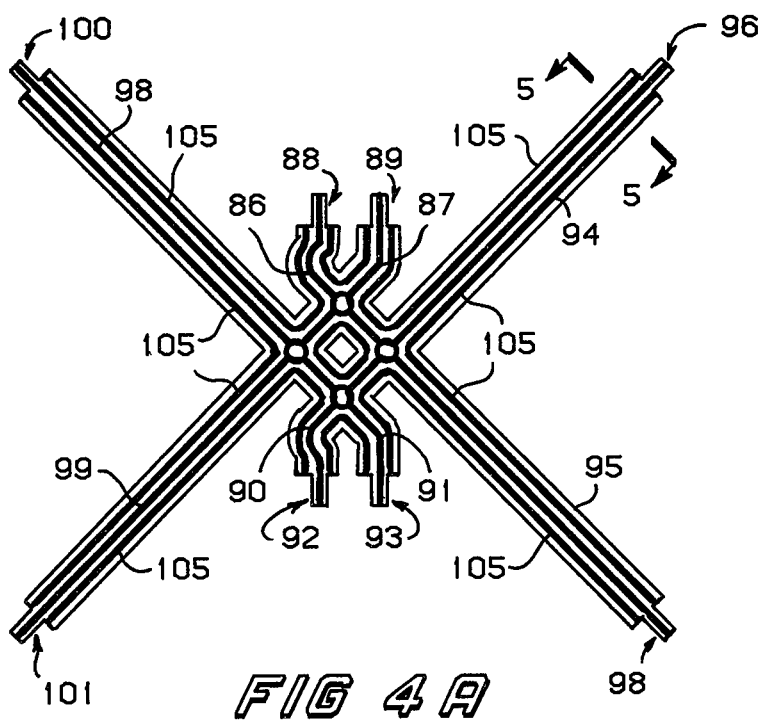
FIG. 4A is a plan view of a millimeter wave monopulse comparator circuit layout in accordance with the principles of the present invention.

Referring to FIGS. 4A and 4B, a millimeter wave monopulse comparator circuit according to the principles of the present invention is shown. FIG. 4B is included to avoid confusion due to crowding of reference numerals in the central portion of FIG. 4A. The basic form of the circuit is microstrip, so as dielectric substrate 62 having a conductive ground plane on the unseen side thereof forms the base for the circuit. A Teflon ® substrate is preferred because the low dielectric constant allows relatively wide microstrip lines for a given impedance. For example, the Polyflon Corp. of New Rochelle, New York supplies a board under the name Cuflon which is 5 mils (0.127 mm) thick and has a $\frac{1}{4}$ mil (0.0085 mm) coat of copper on both sides prior to etching. The relative dielectric constant of the material is 2.1. At 94 GHz a 16 mil (0.406 mm) line has an impedance of approximately 50 ohms and a 5 mil (0.172 mm) line has an impedance of approximately 90 ohms. These line widths are readily obtainable with conventional photo-etching techniques, thereby representing a cost savings over more narrow and difficult to obtain line widths. Thus, due to the lower dielectric constant of Teflon ® substrates more easily repeatable circuits may be constructed than with ceramic substrates. Ceramic substrates had been thought the only suitable material for millimeter wave microstrips due to their highly uniform dielectric properties. Uniformity is critical in a monopulse comparator since the phase relationships between the various signals must be preserved. It has been found, however, that Teflon ® substrates perform adequately at 94 GHz while retaining the advantages mentioned above and being considerably less expensive. While specific boards and materials are specified for exemplary purposes, it will be understood by those skilled in the art that other boards and materials might be utilized.

A first hybrid junction 64 is disposed on substrate 62. Transition sections 65 and 66 connect input lines 86 and 87 to the input ports of hybrid junction 64. Hybrid junction 64 has a port impedance of approximately 90 ohms while input lines 86 and 87 are 50 ohm lines, so transition sections 65 and 66 taper gradually from 16 mils (0.406 mm) to 5 mils (0.127 mm) over a length of approximately 90 mils (2.29 mm). Input lines 86 and 87 are each to be connected to an element of the monopulse antenna array, which may be located off of substrate 62. It is possible to integrate the antenna array onto substrate 62, in which case the input lines themselves will connect to the antenna elements. In the preferred embodiment, a right angle microstrip to waveguide transition 88 connected to input line 86 provides a means for coupling an antenna element to the comparator circuit. Transition 88 is preferably of the type disclosed in the co-pending application entitled "Microstrip To Waveguide Transition" of the same inventor and assignee as the present application and identified by Ser. No. 317,661. In this case the waveguide will lead to a monopulse antenna array which is substantially parallel to substrate 62 and spaced therefrom by some small distance. A right angle microstrip to waveguide transition 89 is similarly connected to input line 87. Input line 86 is meandered to change its length and thus provide means for properly phasing the antenna signals prior to input to the comparator circuit.

In the same manner, transition sections 71 and 72, input lines 90 and 91 and microstrip to waveguide transitions 92 and 93 are connected to the input ports of a second hybrid junction 70. A third hybrid junction 76 disposed on substrate 62 has input ports connected by means of interconnection lines 67 and 74 to the output ports of first hybrid junction 64 and second hybrid junction 70, respectively. A fourth hybrid junction 80 disposed on substrate 62 has input ports connected by means of interconnection lines 68 and 73 to the output ports of first hybrid junction 64 and second hybrid junction 70, respectively. Transition sections 77 and 78, output lines 94 and 95, and microstrip to waveguide transitions 96 and 97 are connected to the output ports of third hybrid junction 76. Similary, transition sections 81 and 82, output lines 98 and 99 and microstrip to waveguide transitions 100 and 101 are connected to the output ports of fourth hybrid junction 80. This comparator circuit is arranged so that hybrid junctions 64, 70, 76 and 80 are at the corners of a square figure. Interconnection lines 67, 68, 73 and 74 form the sides of the square and close it. The remainder of the circuit is arranged outside of the closed figure. This arrangement provides a very compact comparator circuit which is, nevertheless, quite versatile. The input and output lines may be arranged to interface with the overall system design layout. Because the antenna is not necessarily integrated onto the comparator substrate, many different types of antennas may be used.

Figure 5:
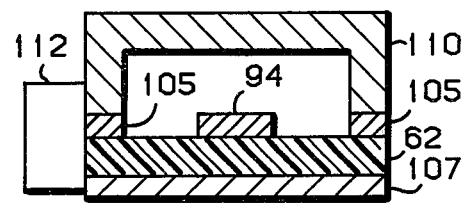
FIG. 5 is a cross-sectional view of a channelized microstrip line along the line 5—5 of FIG. 4A.

Channel lines 105 on substrate 62 run parallel to each of the microstrip lines of the comparator circuit. In addition, a channel line 84 runs parallel to and inside of the interconnection lines. The purpose of channel lines 105 and 84 may best be understood with reference to FIG. 5. A microstrip line, in this case output line 94, is disposed on substrate 62 which separates it from ground plane 107. Channel lines 105 run parallel to microstrip line 94. Channel lines 105 are approximately 10 mils (0.254 mm) wide and are separated from microstrip line 94 by approximately 20 mils (0.508 mm). A channel 110, which is of a conductive metal such as aluminum or the like, contacts channel lines 105 and 84 and forms an enclosure around microstrip line 94. As is shown schematically by electrical connection 112, channel 110 and channel lines 105 are electrically connected to ground plane 107. The comparator circuit thus channelized is not susceptible to interference from nearby sources of electromagnetic radiation such as are found in any practical radar system. Additionally, the isolation between neighboring microstrip lines within the comparator provided by the channel allows the circuit to function accurately despite the very small overall dimensions.

While the invention has been particularly shown and described with reference to a preferred embodiment thereof, it will be understood by those skilled in the art that various other modifications and changes may be made to the present invention from the principles of the invention described above without departing from the spirit and scope thereof.

I claim:

1. In a millimeter wave radar system of the type having a monopulse antenna array comprising four antenna elements and a guidance system for utilizing monopulse guidance signals, a millimeter wave monopulse comparator comprising:

a low dielectric constant substrate having a ground plane disposed on a first side thereof;

a first hybrid junction disposed on a second side of said substrate;

first and second microstrip lines disposed on said second side of said substrate, said first and second microstrip lines being connected to said first hybrid junction, said first and second microstrip lines having first and second predetermined electrical lengths;

means for connecting said first and second microstrip lines to first and second elements of the monopulse antenna;

a second hybrid junction disposed on said second side of said substrate;

third and fourth microstrip lines disposed on said second side of said substrate, said third and fourth microstrip lines being connected to said second hybrid junction, said third and fourth microstrip lines having third and fourth predetermined electrical lengths;

means for connecting said third and fourth microstrip lines to third and fourth elements of the monopulse antenna;

a third hybrid junction disposed on said second side of said substrate;

a fourth hybrid junction disposed on said second side of said substrate;

first, second, third and fourth interconnection lines disposed on said second side of said substrate connecting said first, second, third and fourth hybrid junctions, said first, second, third and fourth microstrip lines lying external to a closed figure formed by said interconnection lines and said hybrid junctions, said interconnection lines being short, straight, high impedance microstrip lines;

fifth and sixth microstrip lines disposed on said second side of said substrate, said fifth and sixth microstrip lines being connected to said third hybrid junction and being external to said closed figure;

seventh and eighth microstrip lines disposed on said second side of said substrate, said seventh and eighth microstrip lines being connected to said fourth hybrid junction and being external to said closed figure;

channel lines disposed on said second side of said substrate running substantially parallel to said microstrip lines and said interconnection lines;

channel means in contact with said channel lines for forming a conductive enclosure of predetermined dimensions about said microstrip lines and said interconnection lines; and means for connecting said fifth, sixth, seventh and eighth microstrip lines to said monopulse guidance system.

2. The monopulse comparator according to claim 1 wherein said means for connecting includes:

a plurality of right angle microstrip to waveguide transitions.

3. The monopulse comparator according to claim 1 wherein said substrate comprises:

a Telfon ® substrate having a relative dielectric constant of approximately 2.1.

* * * * *